United States Patent [19]

Balinth

[11] 4,335,026
[45] Jun. 15, 1982

[54] PRESSURE-SENSITIVE ADHESIVE COMPOSITIONS HAVING HIGH SHEAR AND LOW PEEL RESISTANCE

[75] Inventor: Ivan J. Balinth, Cranford, N.J.

[73] Assignee: Johnson & Johnson Products Inc., New Brunswick, N.J.

[21] Appl. No.: 248,595

[22] Filed: Mar. 27, 1981

[51] Int. Cl.$^3$ ............................................... C08L 7/02
[52] U.S. Cl. .................................. 524/271; 525/240; 524/526; 524/476; 524/482; 524/483; 524/474
[58] Field of Search ................. 260/5, 4, 29.8, 33.6 A, 260/27 BB; 525/240

[56] References Cited

U.S. PATENT DOCUMENTS 2,366,219  1/1945  Soday ............................... 260/27 R
2,567,671  9/1951  Joesting ............................. 117/122
4,022,728  5/1977  Trotter et al. ........................ 260/5

Primary Examiner—Joseph L. Schofer
Assistant Examiner—Bernard Lipman
Attorney, Agent, or Firm—Irving Newman

[57] ABSTRACT

Pressure-sensitive adhesive compositions having decreased resistance to peel removal while maintaining high shear resistance, i.e., holding-power adhesion, in air and in water comprising an elastomeric blend of a selected rubber and a selected olefin terpolymer having a Modulus, $M_{60}$, at 60% elongation of from about 1 to about 1.5 and a polydisparity of no more than about 10, a liquid plasticizer, a reinforcing filler and a solid tackifier.

14 Claims, No Drawings

PRESSURE-SENSITIVE ADHESIVE COMPOSITIONS HAVING HIGH SHEAR AND LOW PEEL RESISTANCE

BACKGROUND OF THE INVENTION

This invention relates to adhesive compositions. More particularly, this invention related to pressure-sensitive adhesive compositions suitable for use in the preparation of adhesive bandages, adhesive tapes, adhesive sheet materials and the like, which provide excellent adhesive characteristics when adhered to a part of the body and do not significantly lose said characteristics when immersed in or exposed to water.

This invention also relates to surgical sheet materials such as adhesive tapes and to adhesive bandages and dressings, such as coverings for cuts, abrasions and the like, which comprise a flexible backing member, one of whose major surfaces had adhered thereto a coating of the pressure-sensitive adhesives of the present invention.

Various types of pressure-sensitive adhesives have been proposed and utilized as the adhesive component in adhesive bandages, adhesive tapes and the like. Acrylate polymers, polyolefinic polymers and compounded systems based on natural or synthetic rubber polymers have all been tried or utilized as pressure-sensitive adhesives with varying degrees of success.

A pressure-sensitive adhesive must have certain characteristics to be useful. It must be sufficiently tacky, i.e., have sufficient "grab" or "quick-stick," to adhere quickly to the surface to which it is to be adhered. It must also continue to adhere to that surface over extended periods of time. A pressure-sensitive adhesive composition should also have sufficient internal strength to prevent splitting and leaving particles of adhesive on a surface to which an article coated with the adhesive has been adhered when the article is removed. Where the pressure-sensitive adhesive is designed for application to the skin, the problems of adherence are substantially increased. Although the initial tack or stick may be good, adherence over an extended period of time for many pressure-sensitive adhesives requires relatively high shear adhesion to withstand movement of the underlying skin. Also, the adhesive must be tailored to accommodate the nature of the underlying skin surface as where perspiration and other surface changes may occur. The problem is further complicated by the fact that any pressure-sensitive adhesive designed for application to the skin must release from the skin sufficiently readily to permit removal without skin damage. Where the adhesive is too strongly adhered to the skin and has substantial internal strength, small particles of the upper layer of skin are removed with the adhesive with resulting irritation to the skin. As a result, although many pressure-sensitive adhesives are available for various commercial uses, relatively few have been found which are suitable for articles for skin applications, particular in that many of those having desirable, high, sheer adhesion, have an undesirably high resistance to removal, or peel adhesion.

In order to reduce peel adhesion, the prior art incorporated waxes, fatty acids and silicones into pressure-sensitive compositions. Alternatively, the prior art reduced the tackifying resin to elastomer ratio to less than 1 to 2 in elastomeric pressure-sensitive adhesive formulations. However, these approaches have led to an undesirable reduction in holding or sheer power adhesion and in increased costs.

SUMMARY OF INVENTION

The present invention provides improved pressure-sensitive adhesive compositions which exhibit good adhesion or holding power and a low peel adhesion when utilized on pressure-sensitive articles.

The pressure-sensitive adhesive compositions of the present invention comprise an elastomeric blend consisting essentially of (1) natural rubber or another elastomeric material; i.e. a synthetic rubber and (2) a selected olefin terpolymer; a liquid plasticizer component, a reinforcing filler, a solid tackifier component and, preferably a stabilizer.

DETAILED DESCRIPTION OF THE INVENTION

A preferred pressure-sensitive adhesive composition of the present invention comprises (1) from about 25% to about 42% by weight of the composition of an elastomeric blend which blend consist of (a) a rubber, preferably a natural rubber, and (b) a selected olefin terpolymer in a weight ratio of from about 7.5:1 to about 2:1 (rubber to olefin terpolymer); (2) from about 5% to about 15%, preferably about 8% to 12%, by weight of the composition of a liquid plasticizer component; (3) from about 12% to about 20% by weight of the composition of a reinforcing filler (4) from about 30% to about 50% by weight of the composition of a solid tackifier component and (5) from 0 to 3% by weight, preferably from 0.2% to 3 by weight of the composition of a stabilizer.

The term "natural rubber" as used in describing this invention includes both the naturally occurring form of rubber, i.e., cis-1,4-polyisoprene, as well as synthetically prepared 1-4,polyisoprene. The polyisoprene should be solid and soluble in toluene. The Mooney viscosity when measured (ASTM-D1646) $ML_{(1+4)}$ at 100° C. should be from about 70 to 100. While natural rubber as defined above is preferred, such chemically related elastomers as polybutadiene and polyisoprene/styrene block copolymers could be substituted therefor in the elastomeric blend in accordance with this invention; they should therefore be considered to be encompassed within the term "rubber" for the purpose of defining the present invention.

The elastomeric portion of the adhesive composition of the present invention should be from about 25% to about 42% by weight of the total composition and preferably 32% to 38% by weight to achieve the desired peel adhesion. The presently preferred natural rubber for use in the elastomeric blend of the adhesive composition of the present invention is natural cis-1,4-polyisoprene available commercially as SMR-L (Standard Malaysian Rubber-Light color).

The presently preferred olefin terpolymer for use in the elastomeric blend of the adhesive composition of this invention is an EPDM (ethylene-propylene-diene monomer) terpolymer wherein the ratio of ethylene to propylene monomer is approximately 3:1 by weight and the diene termonomer is 1,4-hexadiene and is present in an amount of from about 1% to about 8% by weight, preferably about 2% about 5% by weight, more preferably about 3.5% by weight. A commercially available example of such terpolymer is that available from E. I. du Pont de Nemours & Company under the trademark NORDEL 2744. It has a Mooney Viscosity, $ML_{(1+4)}$ of about 48 at 121° C. and a Modulus, $M_{60}$, at 60% Elongation, of about 1.2 megapascals. An acceptable Modulus, $M_{60}$, range for EPDM terpolymers for use in the compositions of this invention is between about 1 and about 1.5 megapascals.

Further, the preferred EPDM elastomer has the following approximate average molecular weights (relative to polystyrene):

Weight-Average Molecular Weight—200,000
Number-Average Molecular Weight—34,000

The polydisparity, which is the value obtained by dividing weight-average molecular weight by number-average molecular weight, should be no greater than about 10, preferably from about 4 to about 8 and most preferably about 6. Polydisparity is a measure of molecular weight distribution. The relatively low, narrow range polydisparity of the preferred EPDM terpolymers used in the compositions of the present invention is believed to afford the desired balance of high shear adhesion and low peel adhesion when used in the ratios specified above for the elastomeric blends. EPDM terpolymers with substantially higher polydisparities do not yield adhesives having this desired balance of properties.

The liquid plasticizer component of the pressure-sensitive adhesive compositions of the present invention should comprise from about 5% to about 15% by weight of the total composition, preferably about 6% to about 10% by weight, to achieve the desired tack. The liquid plasticizer component controls the tackiness of the adhesive compositions. It can be selected from the group consisting of isomeric liquid polybutenes; mineral oils; low molecular weight polyterpenes, such as the polyterpene sold under the trademark Wingtack 10 by Goodyear Chemical Company, the polyterpenes sold under the trademarks Piccolyte S-55 and Piccolyte A-40 by Hercules Chemical Company, and the polyterpene sold under the trademark Zonarez 25 by Arizona Chemical Company; and low viscosity rosins such as the low viscosity rosin sold under the trademark Stabelite Ester #3 by Hercules Chemical Company; and mixtures thereof. When mineral oils are included in the liquid plasticizer component, they should comprise no more than 50% of the liquid plasticizer component in order to avoid loss of adhesive characteristics. They should therefore be combined with one or more of the other above-mentioned liquid plasticizers.

The solid tackifier component of the adhesive composition should comprise from about 30% to about 50% by weight of the total composition, preferably about 37% to about 43% by weight, most preferably about 40% by weight, to achieve the desired results. The solid tackifier component should exhibit a softening point of between about 95° C. and 125° C. If the solid tackifier component has a softening point less than about 90° C. (as measured by Ring and Ball ASTM E28) the resulting adhesive composition will not exhibit satisfactory adhesiveness, particularly with respect to the level of undesirable residues that may remain on the skin upon removal. If the solid tackifier component has a softening point above 125° C., the resulting adhesive may cause skin damage upon removal. The solid tackifier component can be selected from the group consisting of normally solid polyterpenes, solid rosins and mixtures thereof. Specific normally solid polyterpenes which are useful include a normally solid polyterpene sold under the trademark Piccolyte S115 by Hercules Chemical Company, a normally solid polyterpene sold under the trademark Wingtack 115 by Goodyear Chemical, a normally solid hydrocarbon tackifier sold under the trademark Escorez 1304 by Exxon Chemical Company, and normally solid polyterpenes sold under the trademarks Nirez 1115 and Nirez 1125 by Reichold Chemical Company. Specific solid rosin tackifiers include those sold under the trademarks Pentalyn A and Polypale Ester No. 10 by Hercules Chemical company.

The reinforcing filler can include silicas, such as that sold under the trade name HI-SIL233, and various oxides such as zinc oxide.

If desired, the pressure-sensitive adhesive compositions of the present invention can include from 0 to about 10% by weight, preferably from about 2% to about 7% by weight, of fillers, extenders, antioxidants, stabilizers, plasticizers, color pigments, and other such ingredients known in the art for inclusion in such compositions.

The extenders can include finely divided clays, bentonites, carbonates such as calcium carbonate, diatomaceous earth, starches or other inert ingredients normally used in adhesive compositions. The pigments can include titanium dioxide, carbon black, iron oxides and the like.

Antioxidants and stabilizers can be utilized at levels of from about 0.2% to about 3% by weight of the total composition, preferably from about 1% to about 2%. Suitable antioxidants and stabilizers include butyl zimate; 2,6,di-tert.-butyl-4 methyl phenol, sold under the trademark Ionol by Shell Chemical Company; 2,5-di(-tert-amyl)hydroquinone, sold under the trademark Santowar A by Monsanto Chemical Company; a mixture of alkylated diphenylamines sold under the trademark Agerite Stalite by Vanderbilt Chemical Company, and the like. These stabilizers and antioxidants give improved shelf life characteristics and prevent degradation of the pressure-sensitive adhesive compositions of the present invention. It has further been found that to obtain pressure-sensitive adhesive compositions with the desired characteristics, it is necessary for such compositions to have a Williams plasticity measurement of from about 2 mm to about 3 mm, preferably about 2.3 mm to about 2.7 mm. If the Williams plasticity is below 2.0 mm, the adhesive compositions will be too soft and exhibit undesirable flow, and have an undesirably high tendency to leave particles of adhesive adhered to the skin upon removal. If the Williams plasticity is above 3.0 mm, the adhesive compositions will be too hard and exhibit poor tackiness.

In the preparation of pressure-sensitive surgical sheet materials for application to the skin, such as pressure-sensitive adhesive tapes, adhesive bandages, surgical drapes, and the like, the pressure-sensitive adhesive compositions of the present invention are coated onto a flexible backing material in accordance with known techniques, such as calendering, extrusion, deposition using organic media, and the like. Suitable flexible backing materials include polymeric films, paper, woven and non-woven fabrics or other similar flexible sheet materials.

EXAMPLES

Specific embodiments of the present invention are illustrated by the following examples. It will be understood, however, that the present invention is not confined to the specific limitations set forth in the individual examples, but rather to the scope of the appended claims.

EXAMPLE I

A pressure-sensitive adhesive composition is prepared by blending 23.6 kg of EPDM (ethylene-propylene-hexadiene terpolymer), having a Mooney viscosity $ML_{(2+10)}$ at 121° C. of about 48 and a polydisparity of about 6, with 65.5 kg of polyisoprene.

As soon as a single phase is achieved by mixing and heating to about 149° C., 20.5 kg of isomeric liquid polybutene is added during a 3 minute period.

The resultant mixture is placed on a two roll sheeter mill manufactured by the Farrel-Birmingham Company.

The temperature of the rolls is adjusted to 93° C. and mixing is commenced for a period of 5 minutes. Thereafter, 90.9 kg of a solid tackifier, such as Wingtack 115, is added and the temperature is raised to 121° C. on the front roll and 149° C. on the back roll for a period of 12 minutes to prepare a pressure-sensitive adhesive of the following composition:

|  | % by Weight |
| --- | --- |
| Polyisoprene | 34.2 |
| Ethylene-propylene-hexadiene terpolymer | 10.8 |
| Isomeric Liquid Polybutene | 10.1 |
| Solid Tackifier | 44.9 |
|  | 100.0 |

EXAMPLE II

A pressure-sensitive adhesive composition is prepared substantially in accordance with the process of Example I and having the following composition:

|  | % by Weight |
| --- | --- |
| Polyisoprene SMR | 25.5 |
| Ethylene-propylene-hexadiene terpolymer (same as in Example 1) | 8.5 |
| Filler | 16.5 |
| Isomeric Liquid Polybutene | 8.6 |
| Antioxidants | 1.4 |
| Solid Tackifier | 39.5 |
|  | 100.0 |

This adhesive composition is suitable for coating on a flexible backing, using techniques well-known in the art, such as those mentioned above in the detailed description of the invention.

EXAMPLE III

A pressure-sensitive adhesive composition is prepared substantially in accordance with the process of Example I and having the following composition:

|  | % by Weight |
| --- | --- |
| Polyisoprene SMR | 25.1 |
| Ethylene-propylene-hexadiene terpolymer (same as in Example I) | 8.1 |
| Fillers | 15.5 |
| Isomeric Liquid Polybutene | 11.4 |
| Titanium Dioxide Pigment | 1.9 |
| Liquid Plasticizer, Wingtack 115 | 38.0 |
|  | 100.0 |

This pressure-sensitive adhesive composition is suitable for coating on a flexible backing. As indicated above, the coating can be accomplished by techniques well-known in the art such as calendering, extrusion, deposition via organic solutions and the like.

As will be apparent to those skilled in the art, changes and variations from the foregoing detailed disclosure can be made without departing from the spirit and scope of the invention.

Having thus described my invention, what I desire to secure by Letters Patent and hereby claim is set forth in the following claims.

What is claimed is:

1. A pressure-sensitive adhesive composition comprising (1) from about 25% to about 42% by weight of the total composition of an elastomeric blend consisting of a rubber and an olefin terpolymer of ethylene, propylene and 1,4-hexadiene, wherein the weight ratio of ethylene monomer to propylene monomer is approximately 3:1 and said hexadiene is present in an amount of from about 1% to about 8% by weight, having a modulus, $M_{60}$, at 60% elongation of from about 1 to about 1.5 megapascals and a polydisparity of up to about 10, the weight ratio of said natural rubber to said terpolymer in said blend being from about 7.5:1 to about 2:1; (2) from about 5% to about 15% by weight of the total composition of a liquid plasticizer component selected from the group consisting of isomeric liquid polybutenes, mineral oils, low molecular weight polyterpenes, low viscosity rosins and mixtures thereof, with the proviso that when mineral oil is utilized, it comprises no more than 50% of the liquid plasticizer component; (3) from about 12% to about 20% by weight of the total composition of a reinforcing filler; and (4) from about 30% to 50% by weight of the total composition of a solid tackifier component, selected from the group consisting of normally solid polyterpenes, solid rosins and mixtures thereof, said pressure-sensitive adhesive composition having a Williams plasticity of from about 2 mm to about 3 mm.

2. The composition of claim 1 wherein the amount of said hexadiene is from about 2% to about 5% by weight.

3. The composition of claim 1 wherein the amount of said hexadiene is about 3.5% by weight.

4. The composition of claim 1 wherein said olefin terpolymer has a polydisparity of from about 4 to about 8.

5. The composition of claim 3 wherein said olefin terpolymer has a polydisparity of about 6.

6. The composition of claim 5 wherein said olefin terpolymer has a Modulus, $M_{60}$, at 60% elongation of about 1.2 megapascals.

7. The composition of claim 1 which comprises from about 32% to about 38% by weight of said elastomeric blend.

8. The composition of claim 1 which further comprises up to 10% by weight, based on the total weight of the composition, of a material selected from the group consisting of fillers, antioxidants, stabilizers, plasticizers and color pigments.

9. The composition of claim 8 which contains from about 0.2% to about 3% by weight, based on the total weight of the composition, of a stabilizer.

10. The composition of claim 7 which comprises from about 6% to about 10% by weight of said liquid plasticizer component, from about 37% to about 43% by weight of said solid tackifier component and from about 1% to about 2% by weight, based on the total weight of the composition, of a stabilizer.

11. The composition of claim 1 wherein said rubber is a natural rubber.

12. The composition of claim 10 wherein said rubber is a natural rubber.

13. The composition of claim 10 wherein said rubber is cis-1,4-polyisoprene.

14. A surgical pressure-sensitive adhesive product comprising a flexible backing having coated on at least one side thereof a pressure-sensitive adhesive composition of claim 1.

* * * * *